United States Patent
Smithson et al.

(10) Patent No.: US 6,299,092 B1
(45) Date of Patent: Oct. 9, 2001

(54) WEBLOCKER RETRACTOR

(75) Inventors: Alan George Smithson, Wetheral; Joseph Patrick Harte, Maryport; John Bell, Carlisle; Kenneth Williamson, Carlisle; Elizabeth Rees, Carlisle; Darren Laidlaw, Penrith, all of (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/508,142
(22) PCT Filed: Sep. 4, 1998
(86) PCT No.: PCT/GB98/02676
  § 371 Date: Mar. 7, 2000
  § 102(e) Date: Mar. 7, 2000
(87) PCT Pub. No.: WO99/12780
  PCT Pub. Date: Mar. 18, 1999

(30) Foreign Application Priority Data

Sep. 8, 1997 (GB) .................................................. 9719069

(51) Int. Cl.[7] .................................................. B60R 22/28
(52) U.S. Cl. .................................... 242/379.1; 242/381.4; 280/805; 280/807
(58) Field of Search .............................. 242/379.1, 381.1, 242/381.4; 280/805, 807; 297/471, 472, 478

(56) References Cited

U.S. PATENT DOCUMENTS 5,436,065  7/1995  Kukamoto et al. .

FOREIGN PATENT DOCUMENTS

| | | |
|---|---|---|
| 34 21 837 | 12/1985 | (DE) . |
| 44 26 479 | 2/1996 | (DE) . |
| 195 47 476 | 4/1996 | (DE) . |
| 196 04 483 | 3/1997 | (DE) . |
| 196 02 267 | 7/1997 | (DE) . |
| 0 487 760 | 6/1992 | (EP) . |
| 0 556 718 | 2/1993 | (EP) . |
| 2 093 523 | 1/1972 | (FR) . |
| 2 652 323 | 3/1991 | (FR) . |
| 2 288 527 | 4/1995 | (GB) . |

OTHER PUBLICATIONS

"Energy Absorbing Webgrabber—Concept B"—Research Disclosure No. 363, Jul. 1, 1994, p. 370 XP000461318, Emsworth, GB.

*Primary Examiner*—John Q. Nguyen
(74) *Attorney, Agent, or Firm*—Markell Seitzman

(57) ABSTRACT

A retractor for a vehicle safety restraint which comprises web locking wedges (49a, 49b) which grip the seat belt webbing (19), under certain predetermined load conditions, so as to more securely restrain the vehicle occupant at the beginning of a crash pulse and which includes a load limiting arrangement so as to allow a limited and controlled pay out of webbing at the beginning of the crash pulse. The web locking retractor thus comprises a wedge (49a, 49b) which has an inner gripping surface with a predetermined coefficient of friction relative to the seat belt webbing so that, at a predetermined loading, the webbing slips past the friction surface of the wedge. This may be achieved by using double thickness webbing along a predetermined portion of the seat belt, for example two layers of webbing, or coating the wedge or a part of the webbing with a material (322) which is erodible or deformable and which may be cut into or eroded by the friction surface of the wedge, or by teeth (320) on that surface. Alternatively or in addition, the wedge comprises a cylindrical drum shaped member of which the outer curved surface is the gripping surface, the drum having a torsion bar arranged along its axis fixed against rotation at one end to the wedge housing and fixed to the cylindrical wedge at a point spaced from the end.

7 Claims, 8 Drawing Sheets

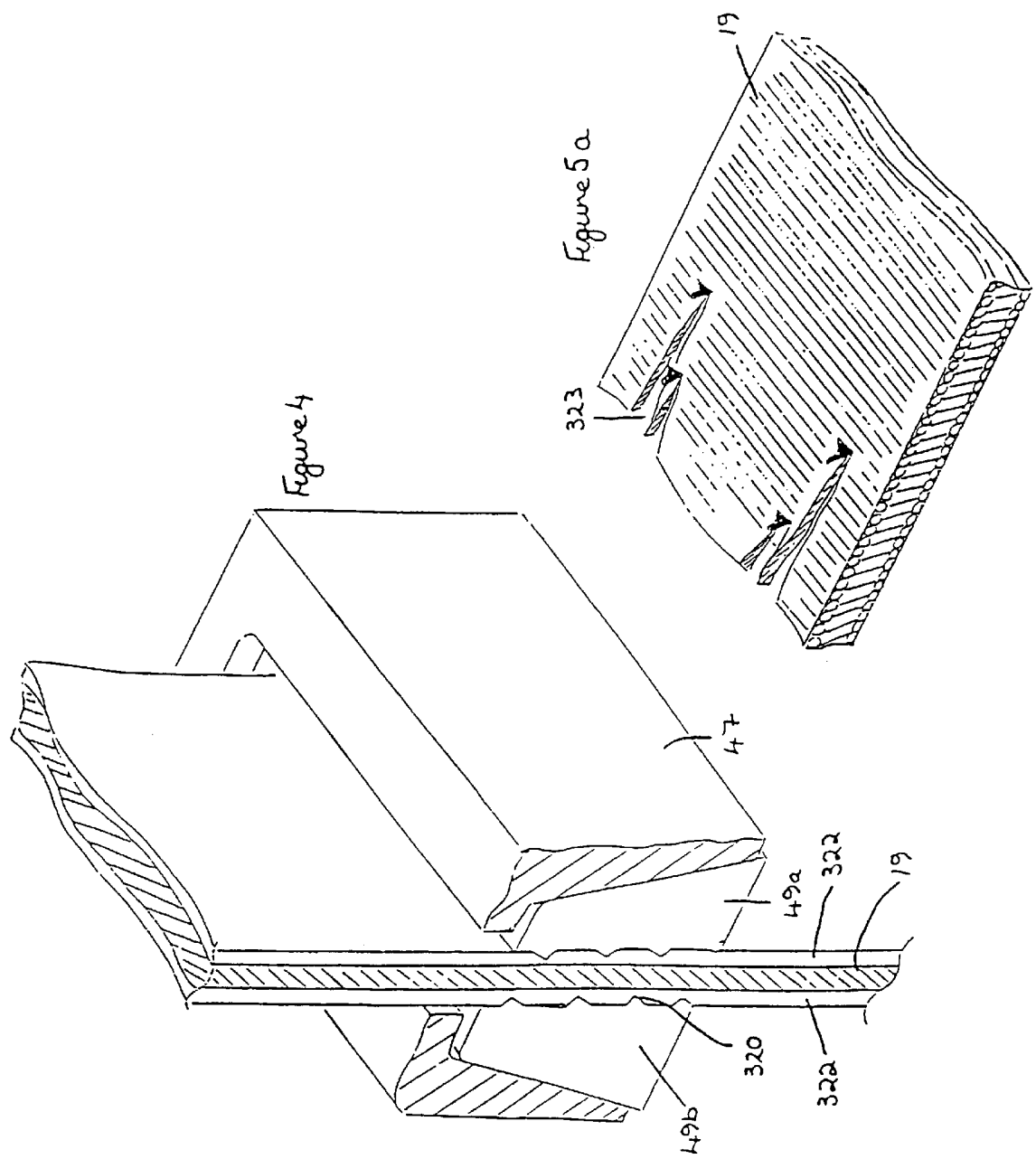

WEBLOCKER RETRACTOR

The present invention relates to a retractor for a vehicle safety restraint and in particular to a retractor which comprises web locking wedges which grip the seat belt webbing, under certain predetermined load conditions, so as to more securely restrain the vehicle occupant. Gripping wedges of this sort are particularly advantageous since they arrest forward movement of the vehicle occupant immediately, at the beginning of a crash pulse. A retractor without a web locker often allows an unacceptable movement of the occupant, even after the retractor mechanism has locked, because of the so-called spool film effect whereby slack in the webbing already wound on the spool is taken up as the webbing is tightened on the spool under load crash conditions. In high speed crashes, this can result in the vehicle occupant moving so far forward as to risk impact with some part of the vehicle interior, with resultant injuries to the occupant.

However, it has recently become evident, that arresting the motion of the vehicle occupant too abruptly, in a high speed crash situation, can itself cause injury to the vehicle occupant via the seat belt webbing itself. Thus it is required to introduce some load limiting arrangement into modern retractors so as to allow a limited and controlled pay out of webbing at the beginning of the crash pulse. Load limiting mechanisms have been suggested. For example, crushable spools, torsion bars placed in the force path between the spool and the retractor locking mechanism, and crushable nuts mounted on the spool shaft.

In web locking retractors it has been suggested to incorporate some load limiting by connecting the web locker wedges together by plastically deformable connectors, as described in EP 0 556 719. Alternatively DE 195 47 576 suggests that the wedges deform a plastic element on the frame of the retractor as they move up to grip the webbing. GB 2 288 527 uses a few longer teeth, arranged amongst normal sized teeth, on the wedges. The longer teeth shear at a certain load.

It is an object of the present invention to provide an improved weblocking retractor.

According to one aspect of the present invention there is provided a web locking retractor comprising a spool on which seat belt webbing is wound and which is lockable under predetermined crash conditions to prevent rotation of the spool in a webbing pay out direction, and a web locking arrangement comprising a wedge housing and at least one wedge mounted in the housing so as to move, under certain load conditions, to grip the webbing against further pay out, the wedge being arranged with a gripping surface having a predetermined co-efficient of friction relative to the seat belt webbing so that, at a predetermined loading, the webbing slips past the friction surface of the wedge.

This may be achieved by using a double thickness seat belt webbing over a predetermined portion of the belt. Alternatively a different coating for the webbing may be used over a different portion of the belt.

Another alternative is to use an erodible material coating the inside surface of the wedge. Such an erodible material will wear away due to friction from the webbing moving past it under a predetermined load and will reveal a surface with a higher coefficient of friction which will grip the webbing. For example the wedges may comprise teeth on their inner surface and the soft erodible material may cover these teeth, until it is worn away.

Alternatively, the wedges may comprise teeth on their inner surface and the webbing may be coated with the erodible material which is cut into and eroded by the teeth.

According to a second aspect of the present invention there is provided a weblocking retractor comprising a spool on which seat belt webbing is wound and which is lockable under predetermined crash conditions to prevent rotation of the spool in a webbing pay out direction, and a web locking arrangement comprising a wedge housing and at least one wedge mounted in the housing so as to move, under certain load conditions, to grip the webbing against further pay out, the wedge being arranged with a gripping surface having a predetermined co-efficient of friction relative to the seat belt webbing so that, at a predetermined loading, the webbing slips past the friction surface of the wedge wherein the wedge comprises a cylindrical drum shaped member mounted in the wedge housing, the wedge having an outer curved surface formed as a gripping surface for the webbing and having a torsion bar arranged along its axis wherein the torsion bar is fixed against rotation at at least one end to the wedge housing and is fixed at a point spaced from said one end, to the cylindrical wedge.

Under crash conditions the cylindrical wedge slides up in the tapered wedge housing and its outer surface impinges on the webbing and grips it against the inside surface of the housing. The load on the webbing causes a rotational torque on the cylindrical wedge which in turn imparts a twisting force on the torsion bar. Thus, under particularly high loads, the webbing is allowed to pay out as the torsion bar twists and thus the instantaneous load felt by the vehicle occupant is limited in a predetermined and controlled manner and the risk of injury to the vehicle occupant from the seat belt webbing is reduced.

Preferably the cylindrical wedge has teeth arranged around its outer surface so as to grip the webbing more securely. The torsion bar may be held in the wedge housing by one or both ends being profiled, for example being in the form of a hexagonal nut fitting in a corresponding hexagonal hole in the wedge housing.

For a better understanding of the present invention and to show how the same may be carried into effect, reference will now be made to the accompanying drawings, in which:

FIGS. 4 and 5a illustrate weblocker wedges and seat belt webbing in accordance with a third embodiment of the present invention;

Figure 1:
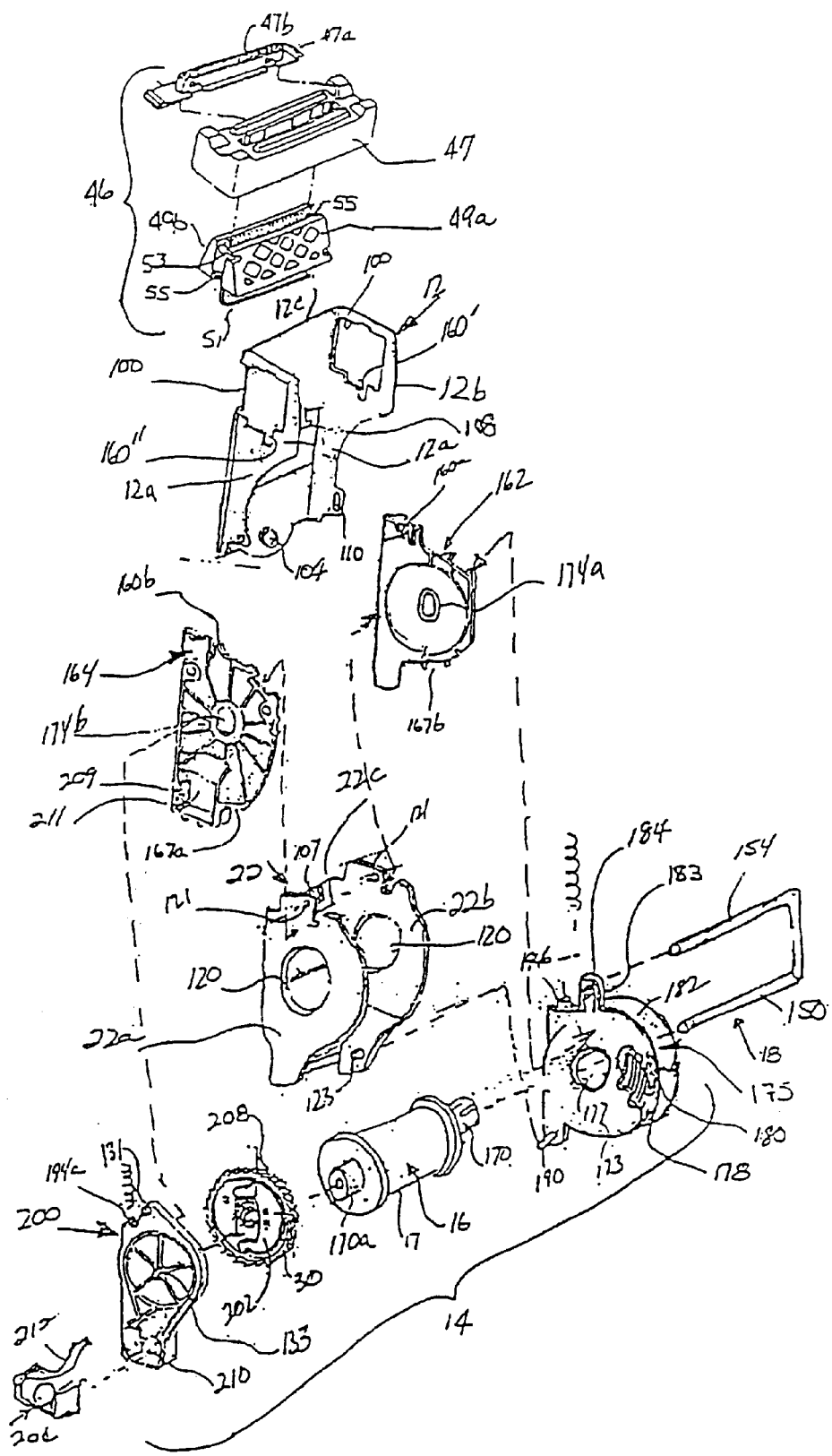
FIG. 1 is an exploded assembly view of a web locking retractor in which the present invention may be incorporated.

FIG. 1 illustrates a retractor reel assembly 14 which slides on a stationary frame 12. A web clamping mechanism 46 is received in openings 100 in the upper portion of the frame 12. The reel assembly 14 is engaged with the lower portion of frame 12 by engagement of bosses 108 in the back portion of frame 12 with complimentary members 107 in the back part of mounting member 22 of the reel assembly 14. This allows the reel assembly 14 to slide on the frame 12. A peg 190 engages through elongated slot 110 in the lower portion of the frame 12 and connects to mounting member 22 via hole 123 in the lower portion of it. This further secures the mounting member 22 to the stationary frame 12 in slidable manner.

The reel assembly 14 will now the described in more detail though it is to be understood that this part of the retractor is well known.

The reel assembly 14 comprises the mounting member 22, the spool or reel 16, a spring cup 175 having a rewind spring 178 therein, a U-shaped needle 150, having a top leg 154 acting as an actuator bar and a lower (shaft) leg 18 and acting as a shaft for the spool 16. A sensor mechanism 200 includes a web sensor 204 and a tooth ratchet wheel 208 fixed to the reel 16 provides information to lock the ratchet wheel and hence the reel from further rotation in a crash situation. The tips or ends of the upper and lower legs of the U-shaped needle are serrated or knurled and are tightly received into openings 131 and 133 within the sensor mechanism.

The mounting member 22 includes two sides 22a, 22b, an upper back portion 22c and a lower back portion 22d. The upper portion of the back portion includes a sliding link or protrusion 107 that slidingly engages the cooperating part 108 in the centre of the back 12c of the stationary frame 12. The interlinking of the frame and mounting member can also be achieved using bosses or rivets extending from the frame that are received in slots in the mounting member. Each of the sides 22a, 22b of the mounting member includes a central opening 120 to receive the spool or reel 16. Each side 22a, 22b also includes a small opening 121 through which the upper leg (actuator bar) 154 of the U-shaped needle extends, thereby linking the two sides 22a, 22b together. The lower end of the right-hand side 22b of the mounting member also includes another small opening 123 through which a peg or pin 190 extends from the spring cup 175.

The sensor mechanism 200 is a multi-purpose part. Situated at the lower end of the mechanism is a walled housing 209 which defines a cavity 211 in which is placed a part of the sensing mechanism housing the vehicle sensor 204. This vehicle sensor includes a pivoted pawl 212 and an inertia mass 213. During an emergency the mass is moved and raises the pawl causing it to engage the teeth 30 (to achieve a pre-blocking condition) of the ratchet wheel 208 thereby preventing further rotation of the reel 16.

The spool or reel 16 includes a centre portion 17 about which the seat belt 19 is wound. The stub axles 170 and 170a extend from this centre part 17. The spool or reel is hollow and the lower leg 18 of the U-shaped needle extends therethrough. The spool rotates about this lower leg.

The spring cup 175 includes a back plate 173 and a generally circular rim 182. The rewind spring 178 is received within the space defined by the back plate and the rim. The lower end of the plate includes the extending peg or pin 190 which is received with the small opening 123 in the lower end of the right-hand side 22b of the mounting member in a generally known manner. The outer end of the rewind spring 178 is looped about a projection 180 formed in the spring cup 175. The spring cup also includes an opening 177 through which the spring arbor 170 extends. The spring cup 175 also includes, on or near its top, an extension 182 which includes an opening 184 through which the upper leg of the U-shaped needle extends. The spring cup includes an upstanding boss or projection 194b to receive a biasing spring 195 to push or bias the reel assembly downward. A similar boss or projection 194a is located on a portion of the sensor mechanism for another spring 195.

The lower leg 18 of the U-shaped needle defines the shaft 18 and provides bearing surfaces 152a and 152b about which the spool rotates. The top leg 154 of the U-shaped needle 18 extends through the openings 160', 160" in the frame, as well as narrow guide slots 160a in a spring inner cover 162 (on the right-hand side of the retractor) and slot 160b in a mechanism bushing 164 (on the left hand side of the retractor).

As can be seen, the end 192 of the peg 190 physically joins the lower end of the right side 22b of the mounting member 22 to further ensure that the spring cup 175, the U-shaped needle 150 and the mounting member 22 move together as an assembly. The rewind spring is covered by an outer cover and the sensor mechanism is also covered by another outer cover (both of which are not shown). The left-hand ends of the upper and lower legs of the U-shaped needle are received within openings 131 and 133 of the sensor mechanism The spring cup 175 is restrained to slide vertically within the guide slot 160a with the upper leg 154. The lower part of the spring cup 175, by virtue of the use of the peg 190 and oval hole 110, also slides vertically. The motion of the left-hand portion of the winding mechanism is similarly restrained to achieve a sliding vertical movement as the upper leg 154 of the U-shaped pin is received through the vertically oriented guide opening 160b in the mechanism bushing so that the upper portion of the sensor mechanism 200 moves vertically. The lower portion of the sensor mechanism, and in particular the housing 210 (in which the vehicle sensor is located), slides against vertical guide walls of the cavity 211 formed within the mechanism bushing.

Frame 12 has two sides 12a, 12b and a rear part 12c. Each side 12a, 12b has a square shaped opening accommodating the web clamping mechanism 46.

This web clamping mechanism 46 comprises a wedge housing 47 and two movable wedges 49a and 49b. The motion of the wedges 49a and 49b is synchronized with integral moulded pins 53 (only one of which is visible) and they are biased apart by springs 55. The wedge housing 47 is held within the opening 100 by a spacer bar 47a which includes a seat belt webbing guide slot 47b. The lower portion 102 of the frame 12 includes a mounting hole 104 and anti-rotation projections 106 which are known in the art.

Extending from each of the sides of the frame 12 is a stationary panel or bushing which can be viewed as an extension of the frame sides 12a, 12b. Situated on the left hand frame side 12a is a mechanism bushing 164. This bushing 164 is attached to frame side 12a. The mechanism bushing includes an oval slot 160b which overlays slot 160" in frame side 12a. The bushing mechanism also includes an opening 174b in its middle through which a stub axle 170a of the spool 16 extends. Located at the lower end of the bushing 164 is an open cavity 211 to slidingly receive the walled housing 210 of the sensor mechanism. Situated on the right hand frame side 12b is a spring bushing 162 which is also referred to as an inner spring cover. This cover includes an oval slot 160a adjacent the oval slot 160" of the frame side 12b. The spring inner cover or bushing 162 includes a vertical oval slot 174a through which a stub axle 170 extends. This stub axle includes a slot 171 to receive an inner end of a rewind spring 178 and functions as a spring arbor. The bushings 162 and 164 are tied together by cross members 165a and 165b that fit in grooves 167a and 167b.

The front wedge 49a includes a semi-circular open groove 51 into which the upper leg 154 of the U-shaped needle foot 18 is secured to provide for a positive engagement between the upper leg and this wedge. The reel wedge 49b is selectively engaged and lifted by a rear portion of the mounting member as it moves vertically.

During an emergency, one or the other of the inertial sensors, the web or vehicle sensor locks with the ratchet wheel pre-blocking the reel 16 from further rotation. With the reel now pre-blocked, the reel assembly is vertically lifted as forces are applied to the seat belt 19. As the reel assembly is lifted the upper leg 154 of the U-shaped needle 158 lifts the front wedge 49*a* initiating the clamping of the seat belt 19. The rear of the mounting member 22 may also be in contact with the rear wedge 49*b* and lifts this wedge as well.

Figure 2:
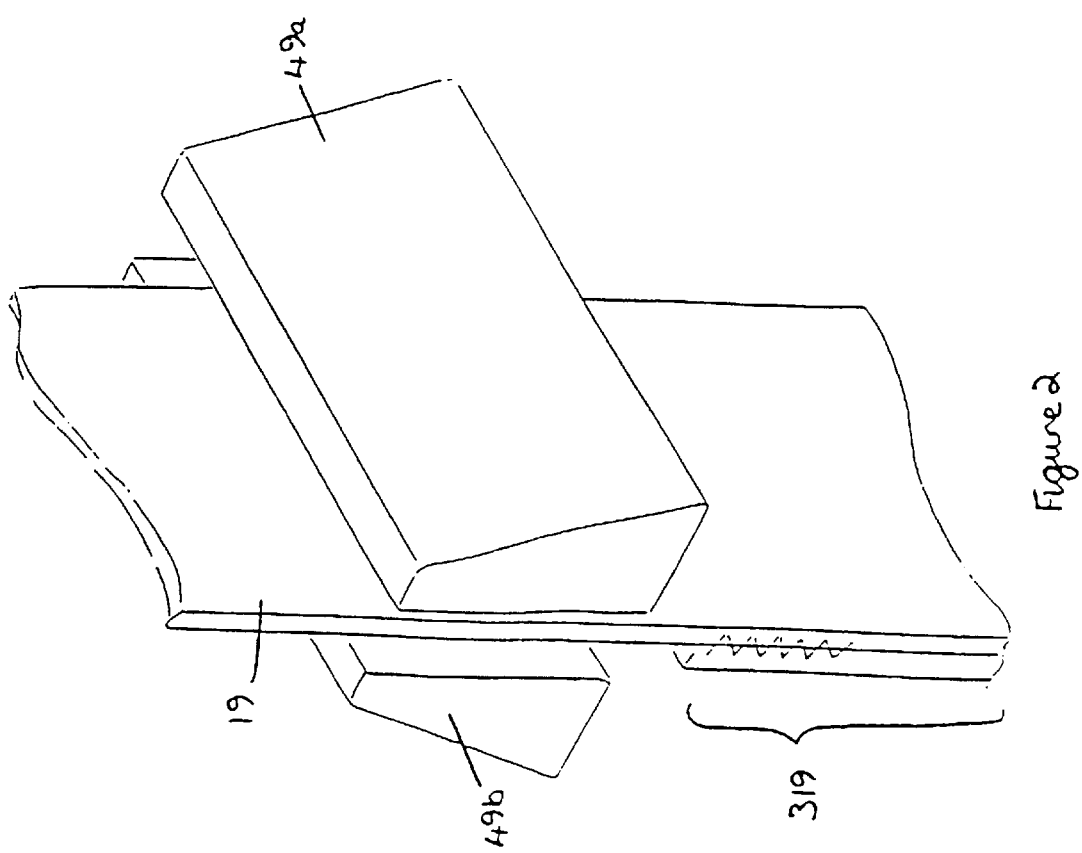
FIG. 2 illustrates, in enlarged view, weblocker wedges and seat belt webbing in accordance with one embodiment of the invention.

FIG. 2 is an enlarged view of the wedges 49*a* and 49*b* and a section of the seat belt webbing 19, according to one embodiment of the present invention. In this embodiment the webbing is made double thickness in the section marked 319 and this double thickness will increase the friction exerted by the wedges 49*a* and 49*b*. Thus a simple form of load limiting is achieved.

Figure 3:
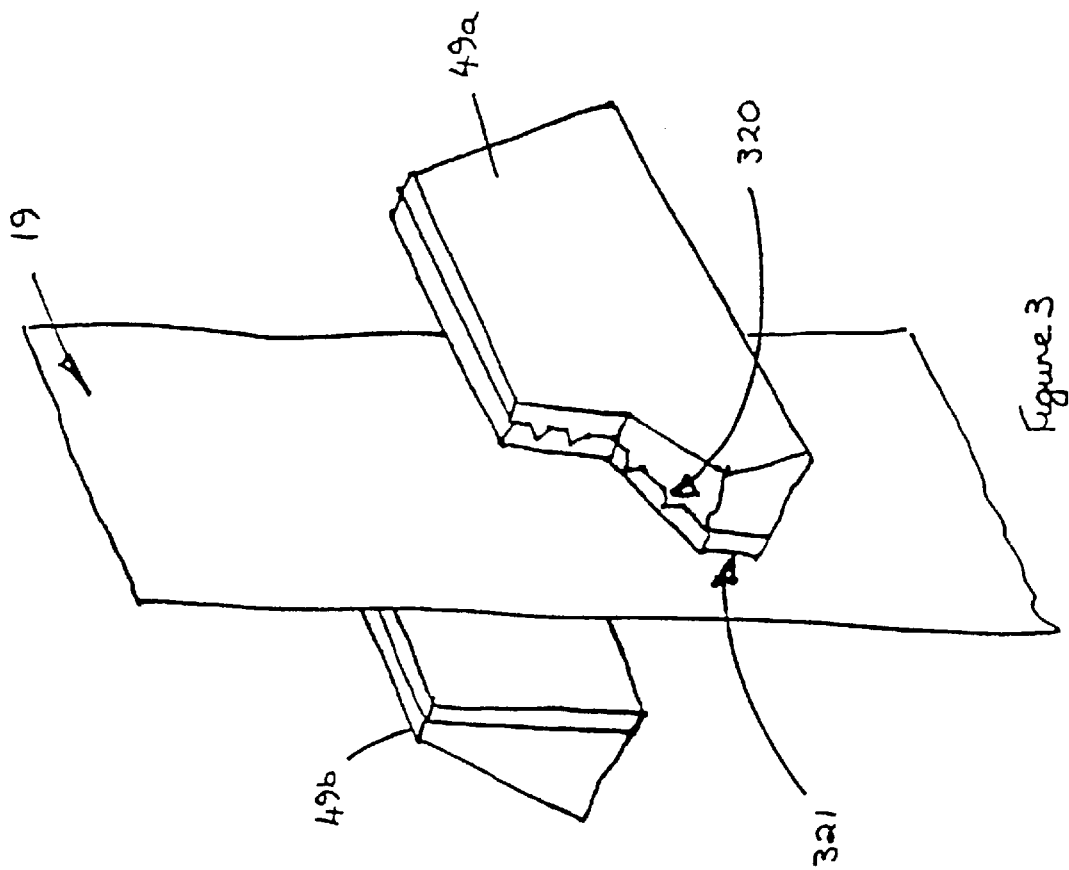
FIG. 3 illustrates weblocker wedges and seat belt webbing in accordance with a second embodiment of the present invention.

FIG. 3 illustrated an alternative embodiment in which the wedges 49*a* and 49*b* comprise teeth 320 which are covered by an erodible material i.e. a soft material which wears due to the friction from webbing under load. This erodible material is marked 321 in FIG. 3.

In this embodiment, after the vehicle impact or acceleration sensors have locked the retractor in the normal way, then the sensor mechanisms will also serve to lift the wedges 49*a* and 49*b* within the tapering housing 47 and thus the inside surfaces of the two wedges 49*a* and 49*b* come into contact with the webbing 19. If a high load is still being applied to the webbing, sufficient to overcome the friction exerted by the erodible material on the webbing, then the webbing will slip and move past the wedges and will thus erode this soft material and absorb energy in a controlled manner as required. once all of the soft erodible material has been worn down, then the teeth 320 are exposed and these will engage the webbing in a more positive manner and prevent further webbing pay out.

Under normal circumstances the webbing will of course run free between the wedges with no contact.

FIGS. 4 and 5*a* another embodiment is shown of the present invention in which the webbing is adapted to absorb some of the load. Again like references denote like parts. The web locker wedges 49*a* and 49*b* are shown mounted within the housing 47. Seat belt webbing 19 runs up between the wedges. In this embodiment the wedges have exposed ridges, or teeth, 320. The webbing 19 is coated on each side by a layer of load absorbing material which may either be deformable or erodible. At a predetermined load the teeth 320 work through the cuter layers 322 and bite into the central webbing 19 to arrest pay out of the webbing.

Figure 5B:
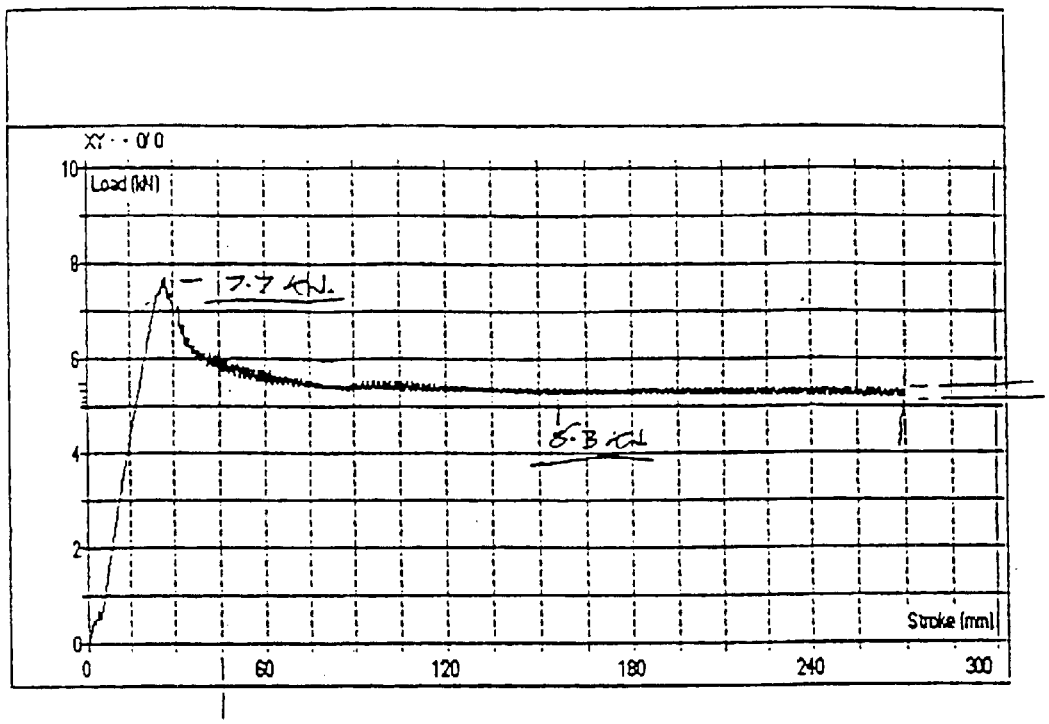
FIG. 5b is a graph showing load against pretensioning stroke for the embodiment of FIGS. 4 and 5.
Figure 6:
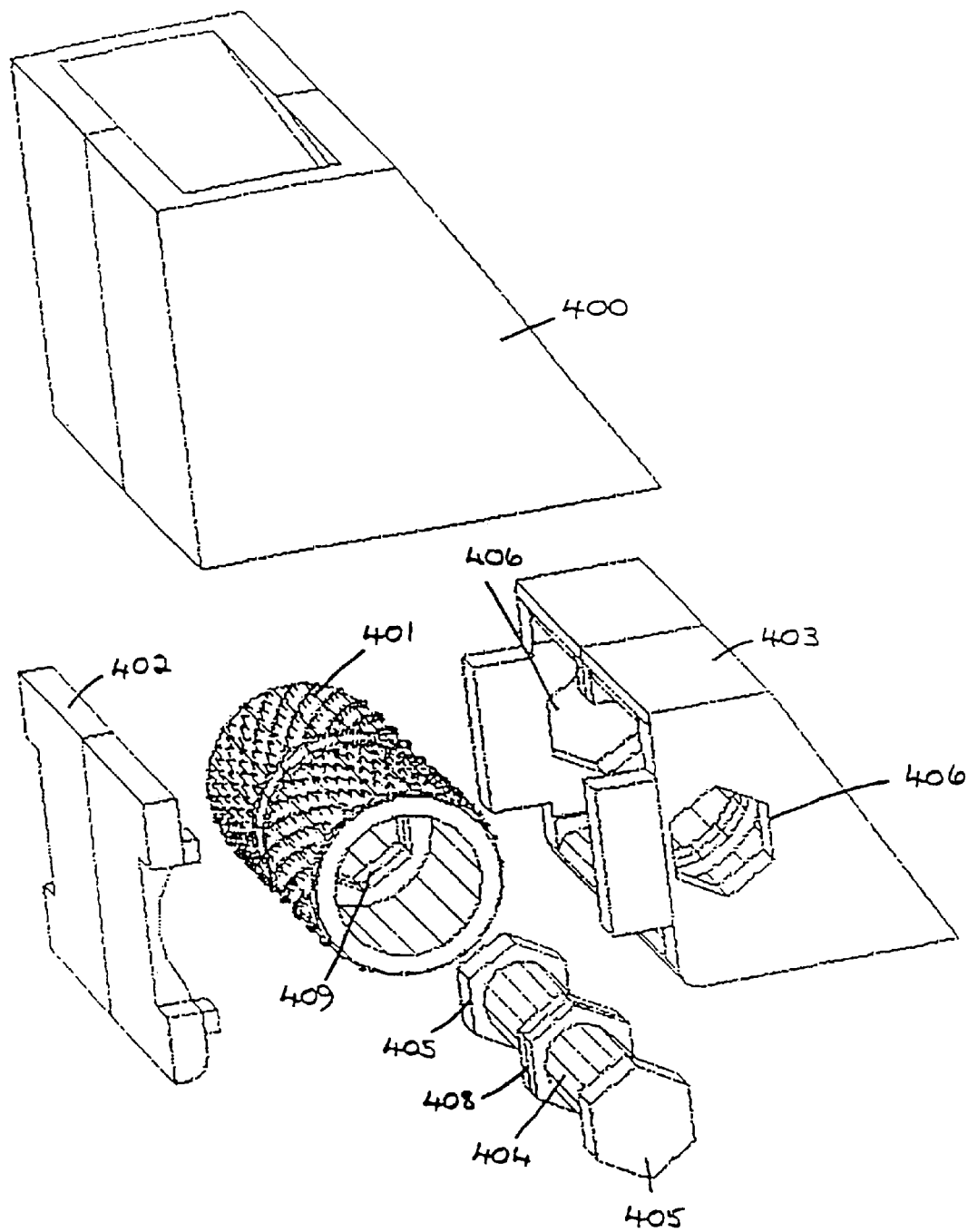
FIG. 6 is an exploded perspective view of a weblocker for a retractor, in accordance with a fourth aspect of the present invention.

FIG. 5*b* shows the relationship between the load (vertical axis) and the pretensioner stroke (horizontal axis) for this embodiment. This shows that the webbing pays out at a constant rate substantially regardless of the specified length required.

FIG. 5*a* shows a slightly different embodiment in which the webbing itself tears so as to absorb some of the load and the tear lines are shown at 323.

FIGS. 6 to 9 illustrate another aspect of the invention. In these Figures a cylindrical single wedge 401 is used. This is held between two parts 402 and 403 of a support carrier and is mounted on a torsion bar 404 for rotation thereabout. The wedge support 402, 403 is mounted in wedge housing 400, and is arranged to be slidable within the housing 400 in a generally vertical direction.

Figure 7:
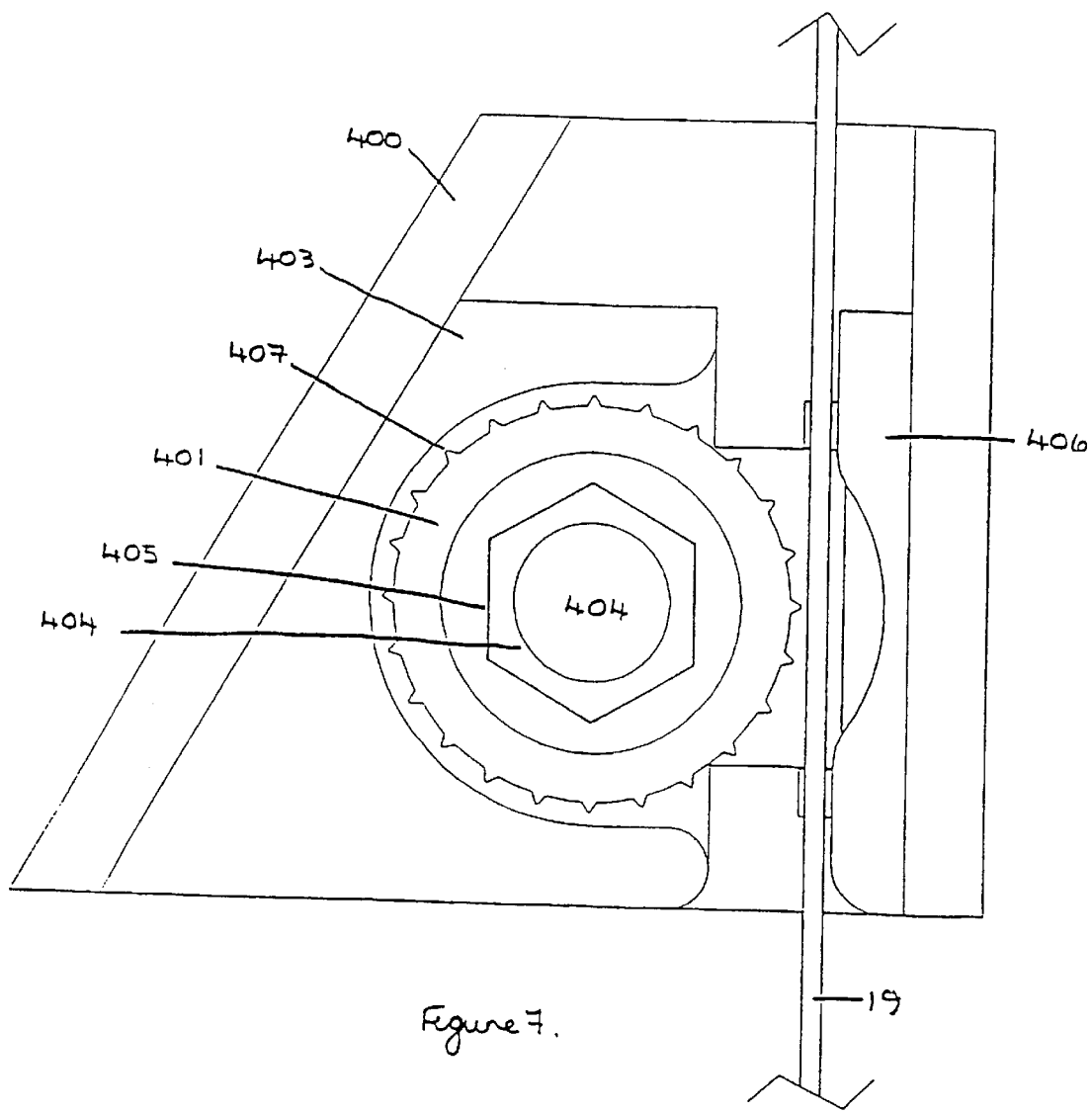
FIGS. 7 to 9 are sequence schematic side view drawings of the weblocker embodiment shown in FIG. 6.

The torsion bar 404 has hexagonal ends 405 which fit in hexagonal holes 406 in one part 403 of the wedge support. Another hexagonal feature 408 fits in a hexagonal hole 409 in the centre of the cylindrical wedge 401. Thus the torsion bar 404 is held at its ends in the wedge support and at its centre in the wedge itself FIGS. 7 to 9 illustrate the sequence of operation of the apparatus illustrated in FIG. 6.

The webbing 19 passes from the retractor (not shown) up through the wedge housing 400. Under normal conditions the webbing 19 passes in a line spaced from the cylindrical wedge 401, between the two parts 402 and 403 of the wedge support. This condition is shown in FIG. 7.

Figure 8:
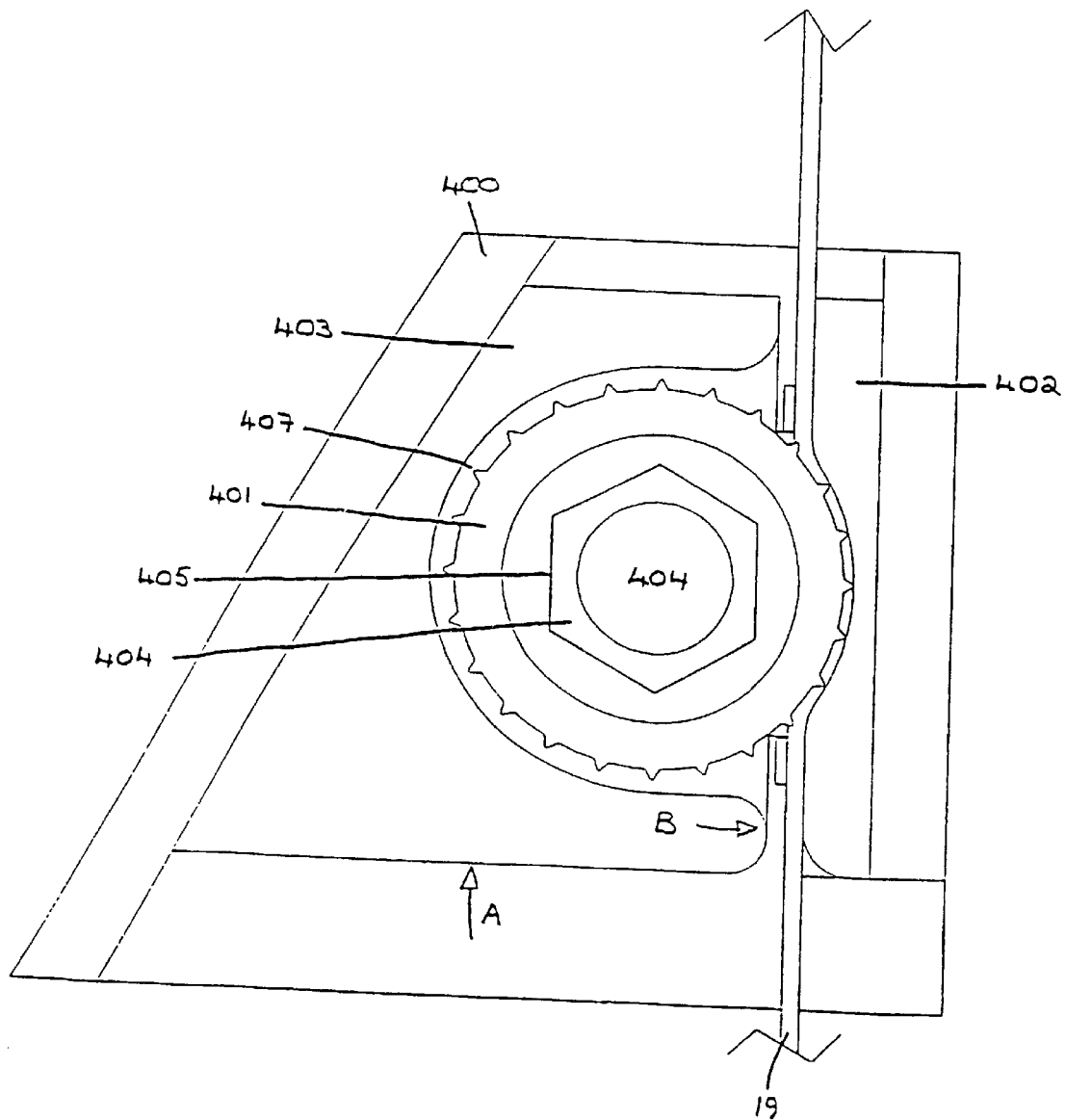

FIG. 8 the situation is shown when the retractor has locked in response to a crash signal. When the retractor locks, a link member pushes the wedge support 403, 402 in a vertical direction as shown by arrow A. The outer edge of wedge support part 403 slides on the inner edge of the wedge 300 housing 400 and because of the tapering of the wedge housing 400, the part 403 is pushed in the direction of arrow B towards the part 402.

Figure 9:
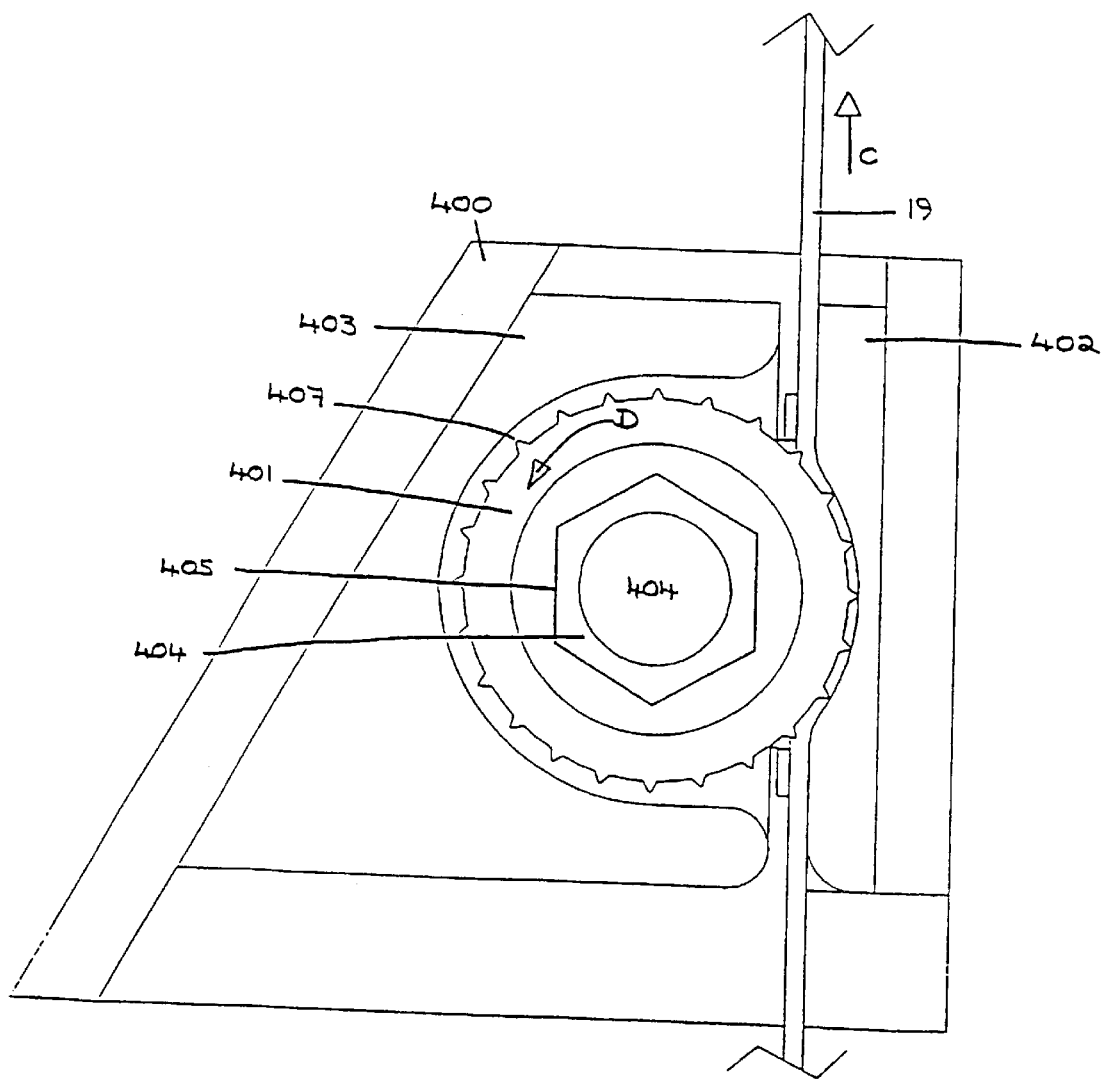

FIG. 9 illustrates the situation when a large load is put on the webbing 19 in a direction indicated by arrow C. This applies a torque to the wedge, in a direction of arrow D. However the torsion bar 404 is fixed at its ends 405, to the support part 403 and thus it cannot freely turn with the wedge. Instead, the torsion bar 404 experiences a twisting moment or torque and substantial energy can be absorbed by this twisting.

What is claimed is:

1. A web locking retractor comprising:

a spool on which seat belt webbing is wound and which is lockable under predetermined crash conditions to prevent rotation of the spool in a webbing pay out direction, and a web locking arrangement comprising a wedge housing and at least one wedge mounted in the housing and movable under certain load conditions to grip the webbing against further pay out, the wedge being arranged with a gripping surface having a predetermined co-efficient of friction relative to the seat belt webbing so that, at a predetermined loading, the webbing slips past the friction surface of the wedge, and wherein the wedge comprises a cylindrical drum shaped member mounted in the wedge housing, the wedge having a gripping surface for the webbing and a torsion bar that is fixed against rotation at at least one end to the wedge housing and is fixed to the cylindrical wedge at a point spaced from said one end.

2. A web locking retractor according to claim 1 wherein the cylindrical wedge has teeth arranged around an outer surface so as to grip the webbing more securely.

3. A web locking retractor according to claim 2 wherein the torsion bar has at least one end profiled to correspond to a shaped hole in the wedge housing.

4. A web locking retractor according to claim 1 wherein the torsion bar has at least one end profiled to correspond to a shaped hole in the wedge housing.

5. A web locking retractor according to claim 4 wherein the profiled end of the torsion bar is in the form of a hexagonal nut which fits in a corresponding hexagonal hole in the wedge housing.

6. A web locking retractor according to claim 4 wherein the profiled end of the torsion bar is in the form of a hexagonal nut which fits in a corresponding hexagonal hole in the wedge housing.

7. A web locking retractor according to claim 1 wherein the wedge includes an outer curved surface that acts as a gripping surface.

* * * * *